United States Patent [19]
Abernathy

[11] 3,982,516
[45] Sept. 28, 1976

[54] STANDBY SYSTEM

[75] Inventor: Kenneth T. Abernathy, Valencia, Calif.

[73] Assignee: Dual Fuel Systems, Inc., Los Angeles, Calif.

[22] Filed: Nov. 11, 1974

[21] Appl. No.: 522,514

[52] U.S. Cl. .......................... 123/120; 123/27 GE; 123/121
[51] Int. Cl.² ........................................ F02M 21/02
[58] Field of Search...... 123/198 D, 198 DB, 27 GE, 123/121, 120

[56] References Cited
UNITED STATES PATENTS

| | | | |
|---|---|---|---|
| 2,518,400 | 8/1950 | Thompson | 123/27 GE |
| 2,612,145 | 9/1952 | Steven et al. | 123/27 GE |
| 2,678,030 | 5/1954 | Bader | 123/27 GE |
| 2,734,490 | 2/1956 | Moulton | 123/27 GE |
| 2,927,562 | 3/1960 | Lafferty | 123/27 GE |
| 2,988,078 | 6/1961 | Ensign | 123/120 |
| 3,114,358 | 12/1963 | Kauffman | 123/120 |

*Primary Examiner*—Charles J. Myhre
*Assistant Examiner*—R. H. Lazarus
*Attorney, Agent, or Firm*—Christie, Parker & Hale

[57] ABSTRACT

An internal combustion engine is normally fueled from a primary source of natural gas. A pressure switch closes upon sensing engine vacuum. A second pressure switch closes at a predetermined low pressure in the primary natural gas source. The closing of these two switches opens a solenoid valve to admit gas from an alternate source to the engine. A check valve prevents gas from the alternate source from flowing towards the primary source. The engine's battery provides electrical energy for the solenoid and the battery is in circuit with the engine's ignition switch.

8 Claims, 1 Drawing Figure

U.S. Patent   Sept. 28, 1976   3,982,516
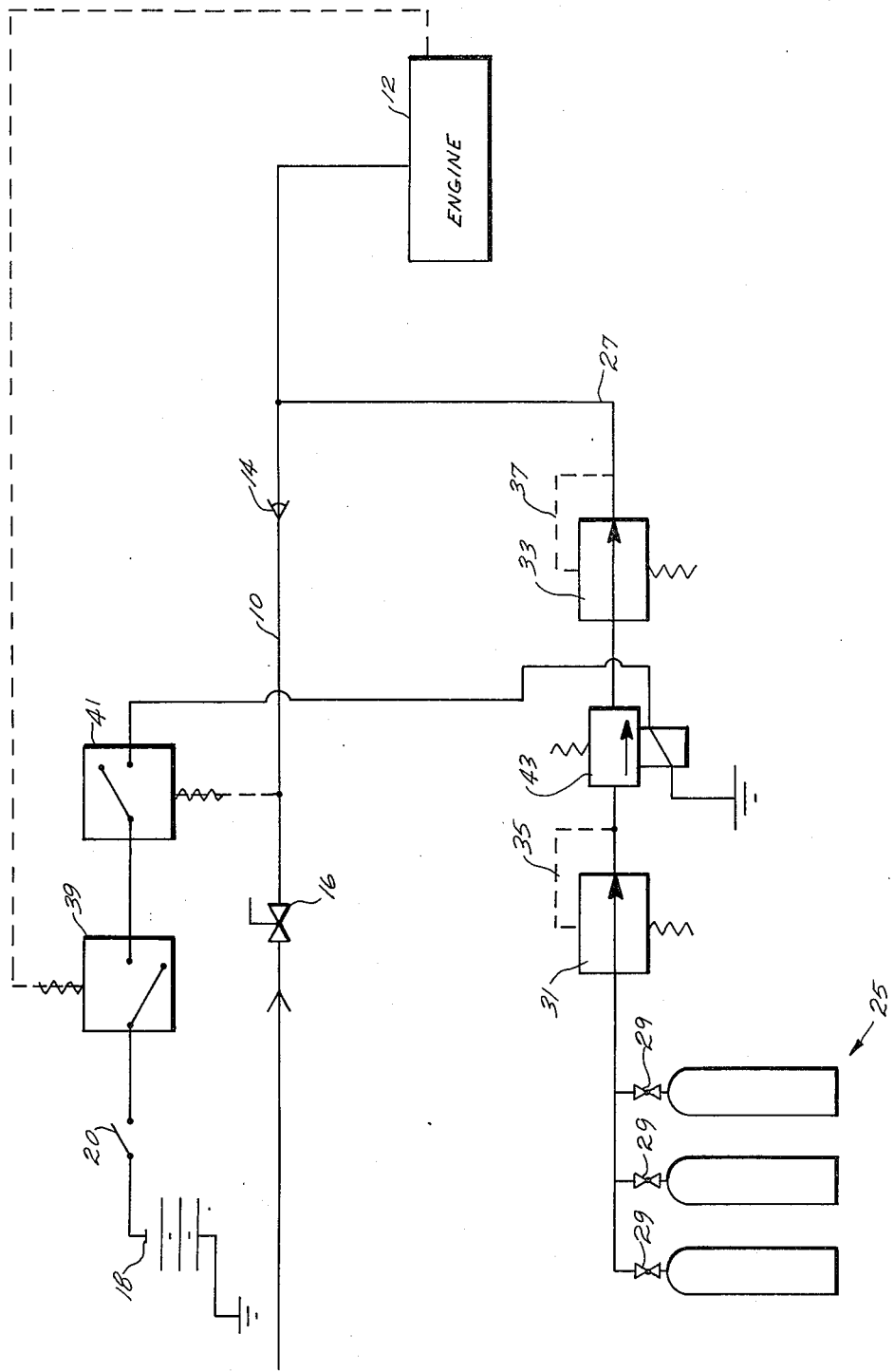

STANDBY SYSTEM

BACKGROUND OF THE INVENTION

The present invention relates to standby systems for internal combustion engines in general and, more in particular, to a standby system for gaseous fueled internal combustion engines.

Natural gas fueled internal combustion engines offer many advantages over engines which use different fuels. Natural gas is typically provided in industrial and municipal operations by a utility. The gas is always available for use. Also, the gas is relatively inexpensive.

Natural gas is also attractive because it is a very clean burning fuel. Without emission controls, pernicious emissions from an engine fueled with natural gas are usually much lower than from the same engine powered by a fuel such as gasoline. Because pernicious emissions are inherently lower with natural gas, the attainment of permissible levels of emissions is easier than with gasoline.

In many services it is absolutely mandatory that the engine operate notwithstanding the failure in a fuel supply. An example is an engine which powers an electrical generator for a hospital.

SUMMARY OF THE INVENTION

The present invention provides a standby system for a gaseous fueled internal combustion engine which is characterized by its sensing of primary fuel source failure and in its being operable only during engine operation or when engine operation is desired.

In general, the present invention contemplates an alternate source of a gaseous fuel for an internal combustion engine. Such a source may be compressed natural gas in cylinders. This source has means for communication with a fuel-air mixer of the engine. Such a means may be a line. Means is provided to bring the alternate source on line only when the engine is operating or is cranking over to start. Such means may include a normally closed solenoid valve preventing communication from the alternate source to the engine and a normally open vacuum switch in the ignition circuit of the engine which closes only when sensing engine vacuum. Thus two conditions must be met before the alternate source can fuel the engine. The first of these is that the engine's ignition be on and the second is that the engine be creating a vacuum. Means is also provided to bring the alternate source on line only when there is a failure in a primary source of fuel. This means may include a pressure switch which closes the circuit to the solenoid when primary pressure drops below a predetermined value.

A preferred and specific construction of the standby system of the present invention contemplates as the alternate or secondary source of gaseous fuel a bank of one or more cylinders of compressed natural gas and line from the cylinders to the engine. This line meets a primary fuel line from a primary source of natural gas, say a utility service. Upstream in the sense of primary gas supply from the junction of the primary line and the secondary line, a check valve prevents flow from the secondary source of fuel past the valve. Gas from the secondary source is regulated to desired pressure. A normally closed solenoid valve is in the secondary line to determine gas flow from the source of secondary gas. The electrical energy to operate the solenoid is from the engine's electrical energy source, say a battery. In addition, the electrical energy source is in the ignition circuit of the engine so that the solenoid will operate only when the engine's ignition switch is closed. A pressure sensitive switch in series circuit with the solenoid senses engine vacuum to close the switch. Engine vacuum occurs when the engine is cranking over or when the engine is running. This pressure sensitive switch is in series with a second pressure sensitive switch which is also normally open and which senses the pressure in the primary gas line. When the pressure in the primary gas line falls to a predetermined value the second pressure sensitive switch will close the circuit to the solenoid and the solenoid valve will open. With the opening of the solenoid valve, gas from the secondary source flows through the secondary line and to the engine. The pressure of the gas from the secondary source will close the check valve to prevent back flow through the primary line. When the ignition is shut off the solenoid closes and fuel from the secondary source stops.

These and other features, aspects and advantages of the present invention will become more apparent from the following description, appended claimed and drawing.

BRIEF DESCRIPTION OF THE FIGURE

The single FIGURE is a line schematic of the standby system of the present invention.

DESCRIPTION OF THE PREFERRED EMBODIMENT

The standby system of the present invention fuels a standard internal combustion engine with natural gas from an alternate source of the gas when a primary source of the gas fails for whatever reason. Natural gas powered internal combustion engines are known. The adaptation of an engine for natural gas use preferably takes the form described in U.S. Pat. No. 3,650,255 to Robert W. McJones.

In the FIGURE, a primary gas line 10 provides natural gas to an engine 12. A check valve 14 in line 10 closes to prevent flow of natural gas away from the engine when the pressure on the engine side of the valve is higher than the pressure on the other side of the valve. An on-off plug cock valve 16 in line 10 determines gas flow to the engine. The fuel pressure may be regulated by a regulator (not shown). Engine 12 has a standard ignition system which includes a battery 18 and an ignition switch 20 in series electrical circuit with the battery in a standard manner. The engine's alternator or generator circuit is not shown because it is not necessary for an understanding of the invention. As such, the switch is normally open. With the exception of check valve 14, what has been described is known.

An alternate source of gaseous fuel for the engine is provided by a series of compressed gas tanks or cylinders 25.

An alternate, secondary or standby line 27 couples the cylinders in parallel and receives gas from the cylinders. Each cylinder has an on-off valve, such as on-off valve 29 which determines flow into line 27.

The pressure of gas in cylinders 25 far exceeds the pressure of gas required at a fuel-air mixer of the engine (a fuel-air mixer aspirates the desired amount of air for the fuel taken into the engine). Accordingly, the pressure of the gas is regulated to a satisfactory operative pressure, in the preferred embodiment of the present invention, by a first stage regulator 31 and a second stage regulator 33, both in fluid series circuit in line 27.

The first stage regulator reduces the gas pressure to a predetermined value, which value is also reduced to a delivery pressure from the second regulator. Regulator 31 and regulator 33 have downstream sensing lines 35 and 37. The flow control elements of these regulators are biased, as by springs, against downstream pressure. When predetermined balances occur the regulators open to allow gas to flow through the line. This is standard.

A vacuum sensing switch 39 is in series with ignition switch 20. The vacuum sensing switch is normally open but will close when it senses a vacuum in the induction system of engine 12. As is standard, its switching element is biased open as by a spring. Engine vacuum occurs during engine cranking or while the engine is in operation. A pressure sensitive switch 41 is in series with vacuum sensing switch 39. The pressure sensing switch is also normally open. Its switching element is biased open in a standard manner by a spring. The switch responds to a predetermined low pressure in primary line 10 to close. In series with both switches is the coil of a normally closed solenoid valve 43. Solenoid valve 43 is in line 27 and determines flow through it. When the valve is closed no gas can flow from the alternate source of fuel. When it is open, gas flows through the line to the engine.

Thus for solenoid valve 43 to open, ignition switch 20 must be closed, vacuum must be sensed by vacuum sensing switch 39 to close its switching element, and there must be a predetermined low pressure in primary line 10 to close switch 41. The latter low pressure corresponds to a pressure indicating a failure of the primary gas supply. When such a failure occurs and engine 12 must be used, the ignition switch is closed and the engine cranked over under the power of battery 18. This creates a vacuum which closes switch 39. Since line pressure does not exist in primary line 10, pressure switch 41 will be closed to establish a circuit from the battery through the coil of normally closed solenoid valve 43 to ground. The establishment of this circuit opens the valve to establish flow through secondary line 27 to engine 12. Pressure of the gas from the alternate source closes check valve 14 to prevent back flow through primary line 10, that is, to prevent flow in a direction away from the engine.

When the engine is turned off, the circuit to the coil of solenoid valve 43 is open and the valve will close terminating the flow of gas from cylinders 25. Such termination would also occur, of course, when vacuum sensing switch 39 no longer senses engine vacuum.

Assuming that a malfunction occurs in the source of primary fuel during operation of the engine, pressure sensing switch 41 will sense the diminution of pressure in primary line 10 and close to establish a closed circuit between battery 18 and the coil of solenoid valve 43 and open the solenoid valve to supply the engine with gas from the alternate source.

In the event that the malfunction in the primary source is rectified, the pressure once again would build up in primary line 10 to open pressure sensitive switch 41. This drops the solenoid out of circuit with the battery and prevents gas from being supplied from the alternate source to the engine. The pressure in line 10 will open check valve 14 to once again supply the engine with fuel from the primary source.

The present invention has application in such environments as engine generators for hospitals which require a standby system to provide electrical energy in the event of an emergency.

The present invention has been described with reference to a certain embodiment. The spirit and scope of the appended claims should not, however, necessarily be limited to the foregoing description.

What is claimed is:

1. A standby system to provide a gaseous fuel to an internal combustion engine in the event of failure of a primary source of fuel, the system comprising:
   a. means for providing an alternate source of a gaseous fuel;
   b. means for communicating the alternate source with a fuel-air mixer of the engine including a line between the alternate source and the fuel-air mixer;
   c. means for preventing communication between the alternate source and the fuel-air mixer unless the engine is producing a vacuum including:
      i. normally open switch means responsive to engine vacuum to close; and
      ii. normally closed solenoid valve means in the line, the coil of the solenoid valve means being in series electrical circuit with the vacuum switch means;
   d. means for preventing communication between the alternate source and the fuel-air mixer unless there is a failure of the primary source including a normally open pressure switch means responsive to a predetermined lower than normal pressure in the primary source to close, the pressure switch means being in series circuit with the vacuum switch means and the coil of the solenoid valve means; and
   e. both communication prevention means include means for providing electrical current to the circuit through both switch means and the coil of the solenoid valve means.

2. The standby system claimed in claim 1 wherein the electrical current provision means includes the ignition circuit of the engine.

3. The standby system claimed in claim 2 wherein both switch means are in series circuit with the ignition switch of the ignition circuit.

4. The standby system claimed in claim 3 including means for preventing gas flow from the alternate source means towards the primary source when gas is being drawn from the alternate source means.

5. A standby system to provide a gaseous fuel to an internal combustion engine in the event of failure of a primary source of gaseous fuel to the engine, the system comprising:
   a. means defining an alternate source of a gaseous fuel;
   b. line means communicating the alternate source means with the engine;
   c. normally closed solenoid valve means in the line means; and
   d. means for opening the normally closed valve means upon the concurrent occurrence of the engine generating a vacuum and failure of the primary source of gaseous fuel including:
      i. a source of electrical current;
      ii. normally open vacuum switch means in series electrical circuit with the source of current and coupled to the engine to sense vacuum created by the engine and upon such sensing to close; and iii. normally open pressure switch means in series electrical circuit with the vacuum switch means and coupled to the primary source to sense the pressure there and to close when such pressure reaches a predetermined lower than normal value.

6. The standby system claimed in claim 5 wherein the source of electrical energy includes the ignition circuit of the engine.

7. The standby system claimed in claim 6 wherein the alternate fuel source includes tank means for storing the gaseous fuel under pressure.

8. The standby system claimed in claim 7 wherein the primary source of gaseous fuel includes primary line means, the line means communicating the alternate source with the engine joining the primary line means, check valve means in the primary line means is provided downstream from the junction of the primary line means and the alternate source line means to prevent gas flow from the alternate source downstream of the check valve means, and the electrical energy source includes the ignition circuit of the engine, the vacuum and pressure switch means being in series with the ignition switch of such circuit.

* * * * *